United States Patent
Ogawa (10) Patent No.: US 7,892,376 B2
(45) Date of Patent: Feb. 22, 2011

(54) TIRE MOLDING APPARATUS WITH FOLDING MECHANISM AND METHOD OF FOLDING IN MOLDING TIRE

(75) Inventor: Yuichiro Ogawa, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 968 days.

(21) Appl. No.: 11/663,721

(22) PCT Filed: Aug. 25, 2005

(86) PCT No.: PCT/JP2005/015463

§ 371 (c)(1),
(2), (4) Date: Mar. 26, 2007

(87) PCT Pub. No.: WO2006/035562

PCT Pub. Date: Apr. 6, 2006

(65) Prior Publication Data
US 2008/0257478 A1    Oct. 23, 2008

(30) Foreign Application Priority Data
Sep. 28, 2004  (JP) .............................. 2004-281387

(51) Int. Cl.
*B29D 30/32* (2006.01)
(52) U.S. Cl. ...................................... 156/132; 156/402
(58) Field of Classification Search .................. 156/132, 156/400, 402, 401
See application file for complete search history.

(56) References Cited

U.S. PATENT DOCUMENTS

| | | | | |
|---|---|---|---|---|
| 2,409,974 A | * | 10/1946 | Breth et al. | 156/132 |
| 3,887,423 A | * | 6/1975 | Gazuit | 156/402 |
| 4,362,592 A | * | 12/1982 | Ruppel | 156/402 |
| 2006/0102272 A1 | | 5/2006 | Iyanagi et al. | |
| 2006/0180263 A1 | | 8/2006 | Takasuka | |

FOREIGN PATENT DOCUMENTS

| | | |
|---|---|---|
| EP | 1547757 A1 | 6/2005 |
| JP | 9-309159 A | 12/1997 |
| JP | 2001-293793 A | 10/2001 |
| JP | 2002-81404 A | 3/2002 |
| WO | 2004/012928 A1 | 2/2004 |
| WO | 2004/069528 A1 | 8/2004 |

OTHER PUBLICATIONS

Machine translation of JP 2002-081404-A, patent document published Mar. 22, 2002.*
Supplementary Search Report dated Jul. 29, 2008.

* cited by examiner

*Primary Examiner* — Geoffrey L Knable
(74) *Attorney, Agent, or Firm* — Sughrue Mion, PLLC (57) ABSTRACT

A tire molding apparatus folds the periphery of bead portions at a low speed with an increased pressing force. The tire molding apparatus has folding mechanisms including fingers to fold the tire component to the periphery of bead cores. Folding fingers (101) are integrally provided with cams (120), which rotate in accordance with the swing of the fingers. The fingers (101) receive a driving force of a driver (130) through cam followers (122) energized by springs and the cams (120), and open. The cams (120) are rotated in accordance with the opening of the finger, compressing the springs energizing the cam followers (122). The compression of the springs reduces the opening speed of the fingers (101), and increases the pressing force of finger rolls (104) applied to the tire component (K).

4 Claims, 7 Drawing Sheets

Prior Art

FIG. 11B

Prior Art

TIRE MOLDING APPARATUS WITH FOLDING MECHANISM AND METHOD OF FOLDING IN MOLDING TIRE

TECHNICAL FIELD

The present invention relates to a tire molding apparatus with a folding mechanism for folding a carcass to the periphery of bead cores, and a method of folding in molding a tire.

BACKGROUND ART

When molding a green tire with a tire molding apparatus, first, ring-shaped bead wires are fitted to bead portions, the both edges, of a cylindrically formed carcass ply. Then, the bead portions of the carcass ply are supported by a pair of movable bodies, which can approach and move away from each other along a main shaft of a molding drum (widthwise of the tire to be molded). A bladder made of elastic material, such as rubber, is fitted between the movable bodies, and the carcass ply is disposed thereon. Next, the bladder is supplied with compressed air to be closely contacted with the inner periphery of the carcass ply, thereby swelling and diametrically expanding the middle portion of the carcass ply, axially of the main shaft of the drum, through the bladder. At the same time, the bead portions of the carcass ply are brought close to each other by the movable bodies. Then, by swinging folding mechanisms mounted on the movable bodies from a closed position, where their ends are pointing axially inward, to an open position, where their ends are pointing the other way from the main shaft (radially outward of the tire), the carcass ply is folded to the periphery of the bead portions with folding members provided on the ends of the folding mechanisms. Finally, a belt-tread band, formed into a ring shape by pressing them together beforehand is fitted on the outer surface of the carcass ply, and the green tire is completed.

Figure 9:
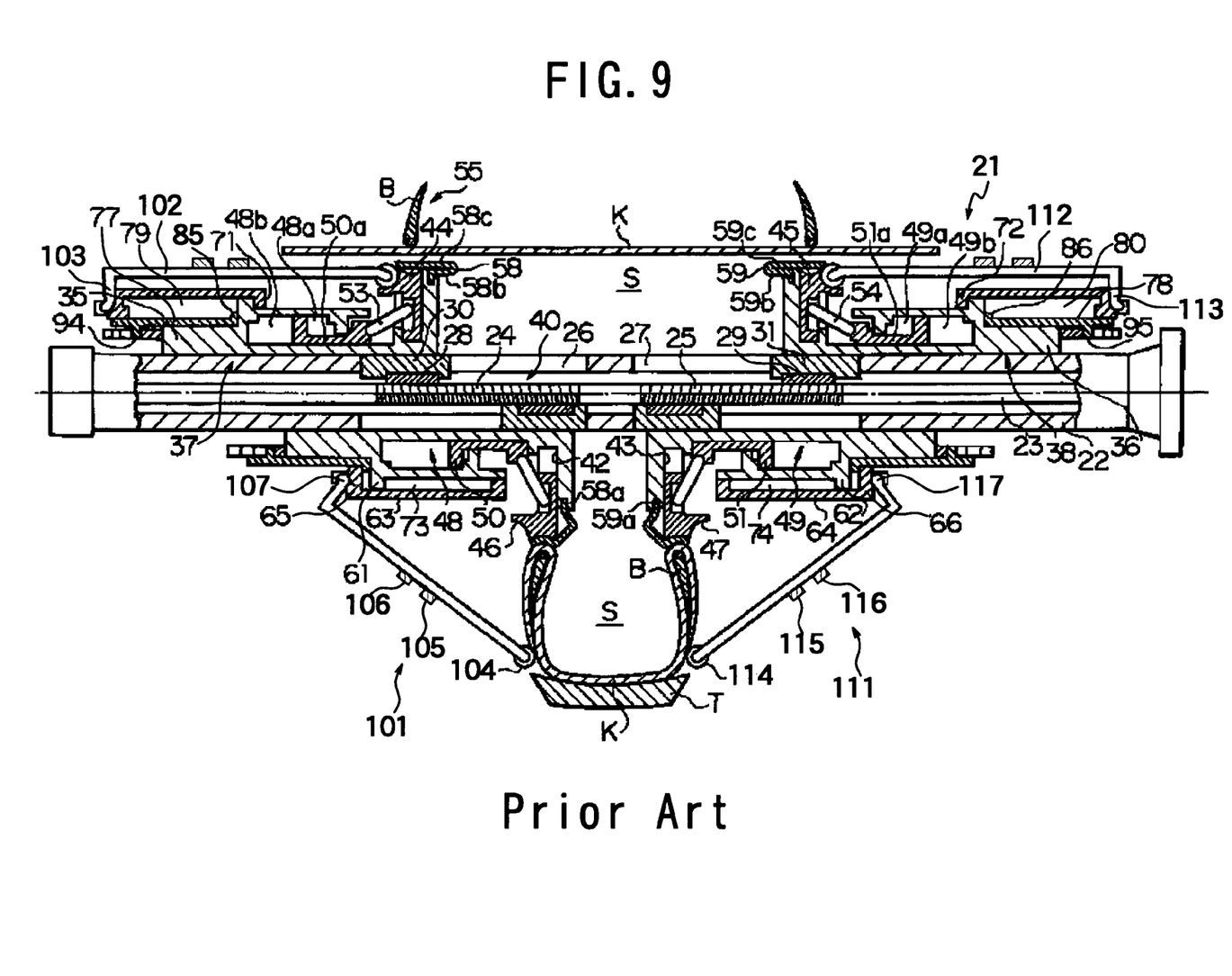
FIG. 9 is a front sectional view of a conventional tire molding apparatus.
Figure 10:
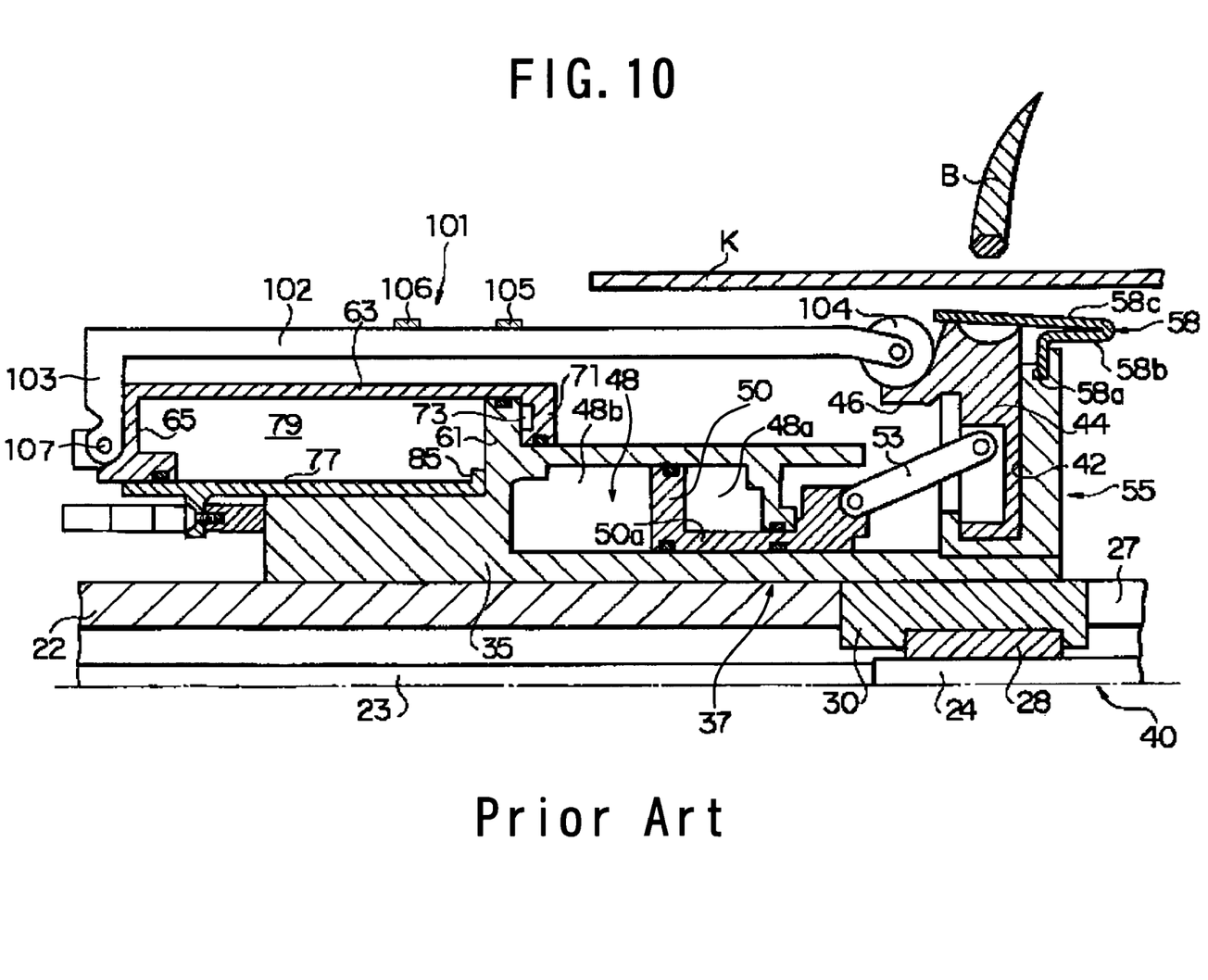
FIG. 10 is a front sectional view of the tire molding apparatus of FIG. 9 in the vicinity of a bead lock segment on the left side.

FIG. 9 is a front sectional view of a conventional tire molding apparatus (refer to Patent document 1), and FIG. 10 is a front sectional view of the vicinity of a bead lock segment of the tire molding apparatus of FIG. 9.

Figure 11A:
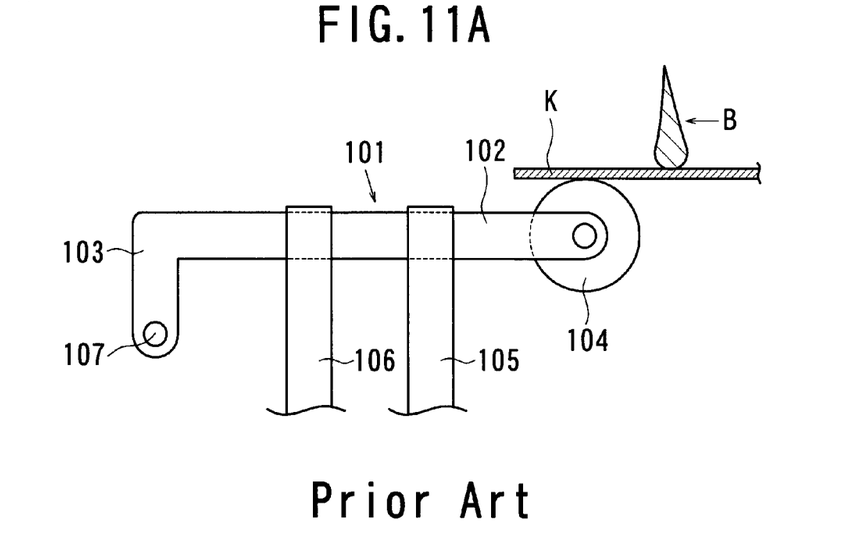
FIG. 11A and FIG. 11B are schematic views of a folding mechanism in the tire molding apparatus in FIG. 9.
Figure 11B:
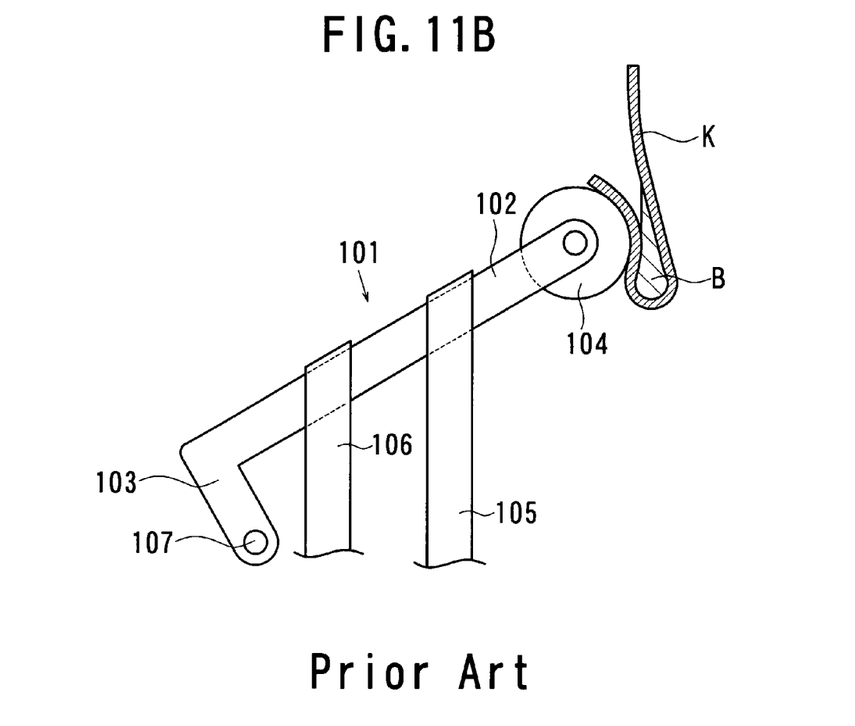

In FIG. 9 and FIG. 10, a tire molding drum 21 used in molding a green tire has a horizontal, cylindrical main shaft of the drum 22. This main shaft of the drum 22 is connected to a driver (not shown) of the tire molding apparatus and can be rotated about its axis by the driver. FIG. 11 is a schematic view of the folding mechanism on the left side of the tire molding apparatus in FIG. 9, wherein FIG. 11A shows a state before folding, and FIG. 11B shows a state during folding.

The main shaft of the drum 22 is inserted with a screw axis 23, coaxial with the main shaft of the drum 22, in a rotatable manner. The screw axis 23 has external threads 24 and 25, threaded reversely to each other, on axially both sides of the circumference thereof. A plurality of axially extending slits 26 and 27 are provided in the main shaft of the drum 22, on the portion overlapping the external threads 24 and 25, respectively. These slits 26 and 27 are provided in a plural number around the circumference and equally spaced from each other. Nuts 28 and 29 threadably fit the external threads 24 and 25, respectively, and are fixed with connecting blocks 30 and 31, which pass through the slits 26 and 27, respectively.

On axially both sides of the main shaft of the drum 22, there are provided generally cylindrical sliding bodies 35 and 36, supported in an axially movable manner and surrounding the main shaft of the drum 22. The connecting blocks 30 and 31 are connected to the sliding bodies 35 and 36, respectively, at the axially inner ends of the sliding bodies 35 and 36. The connecting blocks 30 and 31, and the sliding bodies 35 and 36 collectively configure a pair of movable bodies 37 and 38, supported on axially both sides of the main shaft of the drum 22 in an axially movable manner.

When the screw axis 23 is driven and rotated by the driver of the tire molding apparatus, these movable bodies 37 and 38 move in opposite directions by an equal distance to approach or move away from each other due to the external threads 24 and 25, threaded reversely to each other. The screw axis 23 and the nuts 28 and 29 collectively configure an approaching/separating means 40, which moves the movable bodies 37 and 38 in opposite directions by an equal distance to make them approach or move away from each other.

At the axially inner ends of the sliding bodies 35 and 36, there are provided a plurality of housing holes 42 and 43, which extend radially of the sliding bodies 35 and 36, respectively. These housing holes 42 and 43 are provided in a plural number along the circumference of the sliding bodies 35 and 36 and equally spaced from each other. The housing holes 42 and 43 of the sliding bodies 35 and 36 (the movable bodies 37 and 38) are inserted with and supporting bead lock segments 44 and 45 in a radially movable manner, respectively. On the radially outer ends of the bead lock segments 44 and 45, there are formed axially outwardly projecting finger receivers 46 and 47 respectively, on which ends of folding fingers, more specifically, folding rollers, described later, will be placed. And when the rollers are placed on the bead lock segments, the radially outer ends of the folding rollers and the same of the bead lock segments 44 and 45 will be generally aligned.

In the sliding bodies 35 and 36, there are formed ring-shaped cylinder chambers 48 and 49, each of which housing a ring-shaped piston 50 and 51 in an axially movable manner, which divide the cylinder chambers 48 and 49 into inner chambers 48a and 49a and outer chambers 48b and 49b, respectively. These pistons 50 and 51 have integrally-formed extending parts 50a and 51a, which extend axially inward through axially inner walls of the cylinder chambers 48 and 49. Linkages 53 and 54, provided in a plural number, are connected to the bead lock segments 44 and 45 at one end, and to the axially inner ends of the extending parts 50a and 51a at the other end, respectively, in a pivotable manner. The linkages 53 and 54 are disposed at a slant so as to open into axially inward.

When a high-pressure fluid is supplied into the inner chambers 48a and 49a of the cylinder chambers 48 and 49 from a fluid source (not shown), pistons 50 and 51 move axially outward, which moves the bead lock segments 44 and 45 radially inward. On the other hand, when the high-pressure fluid is supplied into the outer chambers 48b and 49b, pistons 50 and 51 move axially inward, which moves the bead lock segments 44 and 45 radially outward. The pistons 50 and 51, and the linkages 53 and 54 collectively configure an expansion/contraction means 55, which expands and contracts the bead lock segments 44 and 45 by radially and synchronously moving them.

There are provided a pair of sealing members 58 and 59 made of rubber-coated cord cloth, which seal between the movable bodies 37 and 38, including the bead lock segments 44 and 45, and a tire component K, described later, when the tire component K is supported from the radially inward by the bead lock segments 44 and 45 having been diametrically expanded by the expansion/contraction means 55.

The sealing members 58 and 59 have base ends 58a and 59a, airtightly fixed to the top ends of the movable bodies 37 and 38 (the sliding bodies 35 and 36) which are axially more inward than the bead lock segments 44 and 45. And from the radially outer ends of the base ends 58a and 59a, there are axially inwardly extending cylindrical, inward-extending parts 58b and 59b. From the axially inner ends of the inward-extending parts 58b and 59b, there are axially outwardly extending outward-extending parts 58c and 59c, also cylindrical and broader than the inward-extending parts 58b and 59b, overlying the inward-extending parts 58b and 59b radially outwardly.

On the axially middle of the outer surface of the movable bodies 37 and 38, more specifically, the sliding bodies 35 and 36, there are formed flanges 61 and 62, to the outside of which cylindrical bodies 63 and 64 are fitted in an axially movable manner. The cylindrical bodies 63 and 64 have integrally-formed flanges 65 and 66 on the inner surface of the axially outer ends. Base ends (axially outer ends) of folding fingers 101 and 111, provided in a plural number around the circumference at equal angles, are connected to the flanges 65 and 67 in a manner capable of swinging on axes of swing 107 and 117 (the center of swing).

The folding fingers 101 and 111 are configured to be generally L-shape in the front view, with horizontal fingers 102 and 112, which point axially inward of the main shaft of the drum 22 (rightward in the drawing) in the closed position, and supporting fingers 103 and 113, which extend substantially perpendicular to the axial direction from base ends of the horizontal fingers 102 and 112. On the ends of the horizontal fingers 102 and 112, there are fitted folding rollers 104 and 114 in a rotatable manner. Further, the horizontal fingers 102 and 112 are fitted with restoration members 105, 106, 115, and 116 made of elastic material such as rubber band on the middle of the fingers, in a manner surrounding them from the outside. As the folding mechanisms are disposed in a plural number along the circumference of the main shaft of the drum 22 at equal angles, the restoration members 105, 106, 115, and 116 restrain the horizontal fingers of these folding mechanisms in a manner bundling them. On radially outward of the folding fingers 101 and 111, there is disposed the tire component K, on which filler-fitted beads B, including bead cores and bead fillers are disposed.

The cylindrical bodies 63 and 64 have integrally-formed ring-shaped flanges 71 and 72 on the inner surface of the axially inner ends. These flanges 71 and 72 slidably contact parts of the sliding bodies 35 and 36, which are axially more inward than the flanges 61 and 62. And when the high-pressure fluid is supplied into inner cylinder chambers 73 and 74, formed between the flanges 61, 62, and the flanges 71, 72 from a fluid source (not shown), the cylindrical bodies 63 and 64 move axially inward. At this time, the folding fingers 101 and 111 move axially inward with the cylindrical bodies 63 and 64 and open, by which the tire components K axially extending out of the filler-fitted beads B is folded to the periphery of the filler-fitted beads B.

There are fitted cylindrical stopper bodies 77 and 78 on parts of the outer surface of the sliding bodies 35 and 36, which are axially more outward than the flanges 61 and 62. The stopper bodies 77 and 78 slidably engage the flanges 65, and 66 on their circumferences. When the high-pressure fluid is supplied into the outer cylinder chambers 79 and 80, formed between the flanges 61, 62 and the flanges 65, 66 from the fluid source, the folding fingers 101 and 111 move axially outward with the cylindrical bodies 63 and 64, and close.

The stopper bodies 77 and 78 have integrally-formed, radially outwardly projecting flange-shaped stoppers 85 and 86 on the axially inner ends thereof. These stoppers 85 and 86 set a limit that stop the inward movement of the cylindrical bodies 63 and 64 when the flanges 65 and 66 move axially inward of the main shaft and come into contact with the stoppers.

Now, action of the tire molding apparatus having the above configuration will be described. When molding a green tire using the tire molding drum 21, first, the tire component K, including an innerliner and a carcass ply, filler-fitted beads B, and a belt-tread band T which have been molded into a cylindrical shape with the other molding drums, are conveyed to the outside of the tire molding drum 21 by a conveying apparatus and fitted together.

Next, by supplying a high-pressure fluid into the outer chambers 48b and 49b of the cylinder chambers 48 and 49, the pistons 50 and 51 are moved axially inward. Because the bead lock segments 44 and 45 are connected to the pistons 50 and 51 through the linkages 53 and 54, the bead lock segments 44 and 45, being guided by the housing holes 42 and 43, move radially outward of the tire and expand diametrically. And the bead lock segments 44 and 45 support the tire component K and the filler-fitted beads B from radially inward of the tire through the outward-extending parts 58c and 59c of the sealing members 58 and 59.

At this time, because the folding rollers 104 and 114 of the folding fingers 101 and 111 are placed on the finger receivers 46 and 47 of the bead lock segments 44 and 45, the folding rollers 104 and 114 move radially outward with the bead lock segments 44 and 45 by the same distance, which slightly swings the folding fingers 101 and 111 toward the open position. As a result, the tire component K axially extending out of the filler-fitted beads B is always supported by the folding rollers 104 and 114 from the radially inward, and will not droop on the axially outer surface of the bead lock segments 44 and 45 and produce unevenness.

Next, with supplying air into a space S surrounded by the sliding bodies 35 and 36 and the tire component K extending between the filler-fitted beads B, the screw axis 23 is rotated. This causes the external threads 24 and 25 to be rotated, and the movable bodies 37 and 38, the bead lock segments 44 and 45, and the folding fingers 101 and 111 are integrally moved axially inward and brought together. By this, the tire component K extending between the filler-fitted beads B is gradually transformed into a toroidal shape. When the movable bodies 37 and 38 move axially inward to a predetermined position, the rotation of the screw axis 23 is stopped, though the air is continued to be supplied into the space S. As a result, the tire component K transforming into a toroidal shape contacts the belt-tread band T, with the axially middle part thereof closely contacting the inner periphery of the belt-tread band T. At this time, the internal pressure of the space S is maintained by the sealing members 58 and 59.

Then, by supplying the high-pressure fluid into the inner cylinder chambers 73 and 74, the cylindrical bodies 63 and 64, and the folding fingers 101 and 111 are moved axially inward. At this time, because the folding rollers 104 and 114 come into contact with the filler-fitted beads B, extending generally radially, the rollers move generally radially outward along the axially outer surface of the filler-fitted beads B. And as shown in FIG. 11B, the rollers fold the tire component K axially extending out of the filler-fitted beads B radially outward, on the filler-fitted beads B. This radially outward movement of the folding rollers 104 and 114 causes the folding fingers 101 and 111 to simultaneously swing toward the open position.

When the folding rollers 104 and 114 of the folding fingers 101 and 111 swinging toward the open position completely fold the tire component K axially extending out of the filler-fitted beads B, the flanges 65 and 66 of the cylindrical bodies 63 and 64 come into contact with the stoppers 85 and 86 of the stopper bodies 77 and 78. By this, axially inward movement of the cylindrical bodies 63 and 64 is stopped. This state is shown in the lower half of the FIG. 9.

Next, by supplying the high-pressure fluid into the outer cylinder chambers 79 and 80, the cylindrical bodies 63 and 64 and the folding fingers 101 and 111 are moved axially outward until the flanges 71 and 72 come into contact with the flanges 61 and 62. At this time, receiving elastic restoring force of the restoration members 105, 106, 115, and 116, the folding fingers 101 and 111 swing toward the closed position until the folding rollers 104 and 114 are placed on the finger receivers 46 and 47.

Then, with rotating the main shaft of the drum 22, the belt-tread band T is stitched with a stitching apparatus (not shown) and pressure-bonded to the tire component K. Thus, the green tire is completed. Next, after the green tire is gripped by a conveying apparatus (not shown) from the radially outward, the air is exhausted from the space S. At the same time, by supplying the high-pressure fluid into the inner chambers 48a and 49a of the cylinder chambers 48 and 49, the bead lock segments 44 and 45 are moved radially inward, thereby transferring the green tire from the bead lock segments 44 and 45 to the conveying apparatus. Because the top of the outer surface of the outward-extending parts 58c and 59c of the sealing members 58 and 59 are given anti-stick treatment, they can be easily removed from the tire component K (the green tire) at this time.

Finally, the green tire is taken out of the tire molding drum 21 by the conveying apparatus. And by rotating the screw axis 23 reversely of the last time, the movable bodies 37 and 38, the bead lock segments 44 and 45, and the folding fingers 101 and 111 are restored to their original positions.

Patent document 1: Japanese Patent Application Laid-Open (JP-A) No. 2001-293793

DISCLOSURE OF THE INVENTION

Problem to be Solved by the Invention

In the conventional folding mechanism, the restoration members made of rubber bands are fitted to the middle of the horizontal fingers in a manner surrounding them from the circumference, and restrain the horizontal fingers of the folding mechanism in a manner bundling them. Due to the properties of rubber of the elastic members, namely, the rubber bands, the tensile force of the restoration members becomes bigger as they stretch more. This increases the moment about the axes of swing in the direction the folding fingers are restored to the closed position. Therefore, the folding rollers apply a large pressure on the tire component K and make indentations on the surface thereof. If a green tire having indentations on the surface of the tire component is vulcanization-molded and pumped up with air, it will produce unevenness on the surface, which results in deterioration in the commercial value of the tire. If the tensile force of the rubber bands is reduced so as not to make indentations on the tire component K, the tire component in the vicinity of bead cores can not be sufficiently pressure-bonded in folding the green tire. This can result in a more serious problem that the tire causes separations of the tire components when it is used.

The present invention has been made to solve the problems with the conventional folding finger mechanisms. It is a first object of the present invention to minimize indentations (residual indentations) on the surface of a tire component in folding both edges of the toroidally-transformed tire component to the periphery of beads with folding finger mechanisms, and to eliminate insufficient pressure-bonding between the tire components by increasing pressing force in the vicinity of the bead cores. It is a second object of the present invention, to achieve the first object, to control opening speed of the fingers and pressure-bonding force (load) of the fingers applied to the tire component.

Means for Solving the Problems

A first aspect of the present invention is a tire molding apparatus with folding mechanisms comprising: a main shaft of a drum; and folding fingers fitted with folding members on the ends, the fingers swinging between a closed position and an open position on axes of swing on said main shaft of the drum, for folding edges of a toroidally-transformed tire component disposed outside of the circumference of said main shaft of the drum with said folding members in response to the swing of the folding fingers from said closed position to said open position, wherein the tire molding apparatus with folding mechanisms is provided with a means for changing opening speed and pressing force of said fingers capable of changing the pressing force applied to the tire component and folding speed of said fingers.

A second aspect of the present invention is the tire molding apparatus with folding mechanisms according to the first aspect, wherein said means for changing opening speed and pressing force of the fingers comprises: cams or cam followers integrally fitted to said fingers and rotated in response to the swing of the fingers; and cam followers or cams pressing said cams or cam followers to open said fingers and slidable along said main shaft of the drum.

A third aspect of the present invention is the tire molding apparatus with folding mechanisms according to the second aspect, wherein said cam followers or cams are connected to a driver through stretchable elastic members.

A fourth aspect of the present invention is the tire molding apparatus with folding mechanisms according to the second or third aspect, wherein said cams have cam faces to change the opening speed of said fingers from low, at the beginning of opening, to high in cooperation with said cam followers.

A fifth aspect of the present invention is a method of folding a tire component to the periphery of bead cores and pressure-bonding the tire component to bead fillers or the tire component in molding a tire, said method comprising: a first step of folding the tire component in the vicinity of the bead cores at a low speed with a strong pressure-bonding force; and a second folding step of folding the tire component at a higher speed with a weaker pressure-bonding force than the first folding step.

(Effect)

In folding the tire component, the driver transmits a driving force to the cam followers through springs. The force is then transmitted to the fingers through the cams, and the fingers are opened. Then, the tire component is folded to the periphery of the bead portions and pressure-bonded with the folding rollers fitted to the ends of the fingers. At this time, the cams, integrally fitted to the fingers, are rotated with the swing of the fingers and push back the cam followers, energized by stretchable elastic bodies such as springs toward the driver, thereby slowing down or temporally stopping the fingers driven by the driver. At the same time, by applying a restraining force produced by the moment about the axes of swing of the fingers (the moments in the direction restraining the opening of the fingers) due to reaction force of the elastic bodies on the fingers, the opening speed thereof at the beginning of the folding is reduced. Also, by increasing the pressure-bonding force applied to the tire component, the tire components are strongly bonded, especially in the vicinity of the beads, where separations often occur.

According to the present invention, the opening speed of the fingers of the folding mechanisms and the pressure-bonding force applied to the tire component can be freely adjusted. This allows to increase the pressure-bonding force between the tire components in the vicinity of the beads, where the tire components must be pressure-bonded with strong pressing force, while lowering the pressing force applied to the other parts. Accordingly, insufficient pressure-bonding between the tire components, for example, between a carcass ply and a bead, can be fully eliminated, and deterioration in the commercial value of the tire due to indentations can be avoided. Further, this folding and bonding of the tire component can be carried out with a simple configuration.

BRIEF DESCRIPTION OF THE DRAWINGS

1: folding finger; 2: horizontal finger; 3: supporting finger; 4: folding roller; 5 and 6: restoration members; 7: metallic spring means; 71: metallic spring; 9: axis of swing; 21: main shaft of drum; 37 and 38: movable bodies; B: filler-fitted beads; and K: tire component.

BEST MODE FOR CARRYING OUT THE INVENTION

Figure 1A:
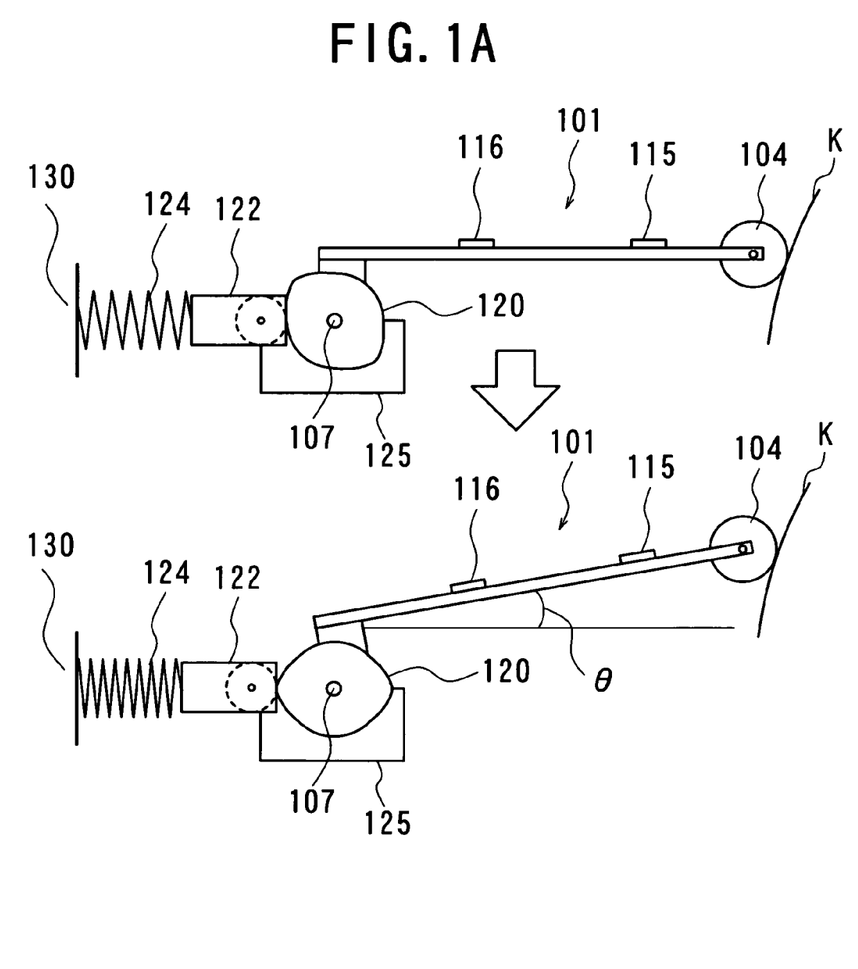
FIG. 1A is a schematic view of a folding mechanism on the left side of a tire molding apparatus according to an embodiment of the present invention.
Figure 1B:
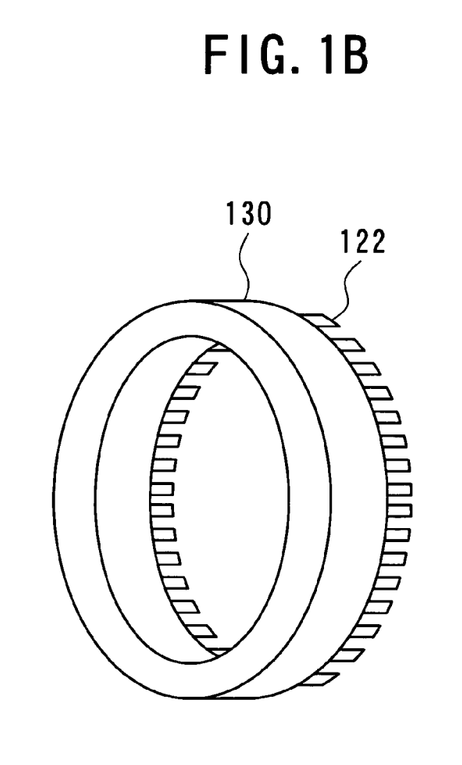
FIG. 1B is an enlarged perspective view of a driver.

An embodiment of the present invention will now be described with reference to the drawings. FIG. 1A is a schematic view of a folding mechanism on the left side of a tire molding apparatus according to an embodiment of the present invention, and FIG. 1B is an enlarged perspective view of a driver.

As shown in FIG. 1A, the folding mechanism according to the present embodiment has a folding finger 101 which includes: a horizontal finger 102, extending generally axially inward of a main shaft of a drum (not shown); and a supporting finger 103, extending substantially perpendicular to the longitudinal direction of the horizontal finger, from an end thereof. The supporting finger 103 is integrally fitted with a cam 120 on an end. The supporting finger 103 is mounted on a retainer 125, slidably disposed on a movable body (not shown) on the main shaft of the drum. And axis of swing 107 of the supporting finger 103 is integrally fitted with the cam 120.

A cam face of the cam 120 is in contact with a cam follower 122. The cam follower 122 is provided in the same number as the finger 101 along the periphery of a ring-shaped driver 130 through a metallic spring 124, for example, and equally spaced from each other. The driver 130 is driven by any means (not shown), for example, a cylinder-piston mechanism disposed on the movable body, to move the finger 101 axially inward of the main shaft of the drum and make it perform folding operation.

When the folding mechanism is operating, a tire component K is disposed radially outward of the folding finger 101, and filler-fitted beads B, including bead cores and bead fillers, are disposed thereon. When the driver 130 moves axially inward of the main shaft of the drum to fold the tire component K to the periphery of the bead cores, the driving force of the driver is transmitted to the cam 120 through the spring 124 and the cam follower 122. Then, the finger 101, integrally connected to the cam 120, moves axially inward of the main shaft of the drum along the axis. When a folding roller 104, fitted to the end of the horizontal finger 102, comes into contact with the outwardly swelled tire component, the finger begins to open.

More specifically, the finger 101 opens outward, overcoming the tensile force in the direction of the main shaft of the drum applied by rubber bands 115 and 116, fitted around the horizontal finger 102. And the folding roller 104, fitted on the end of the finger, moves over the outer surface of the tire from the bead core side to the shoulder side with folding and pressure-bonding the tire component K.

In the present embodiment, the axis of swing 107 of the finger is integrally fitted with the cam 120. Therefore, when the finger 101 opens, the cam 120, integrally fitted to the axis of swing 107, is rotated, resisting spring force acting on the cam follower 130. At the same time, the spring 124 is compressed under the driving force of the driver 130 and the pressing force of the cam 120. When the spring 124 is compressed, the distance between the driver 130 and the finger 101 is reduced, and the finger 101 relatively gets close to the driver 130. By this, the displacement of the finger 101 in the direction axially inward of the main shaft of the drum is reduced. As a result, the movement of the finger 101 in the above direction, and also the opening speed thereof, are slowed down or temporally stopped. Further, due to the reaction force of the compressed spring 124, the moment in the direction restricting the opening of the finger 101 is generated about the axis of swing 107 of the finger 101. Therefore, in addition to the moment produced by the rubber bands 115 and 116, the moment produced by the spring force is applied to the folding roller 104 of the finger 101. This produces a stronger pressure-bonding force applied to the tire component K. Accordingly, by properly setting the shape of the cam face, a region where the finger 101 slows down the opening speed during the opening operation, and the pressing force (load) applied to the tire component K can be freely controlled.

Figure 2:
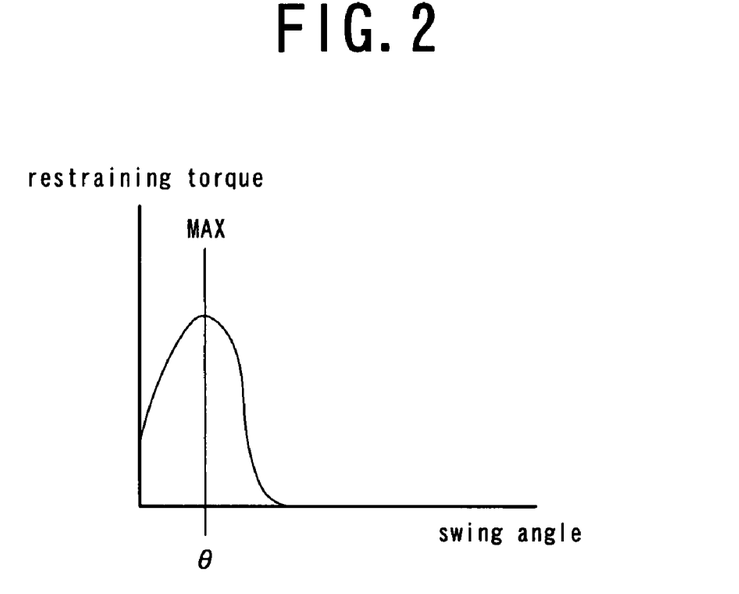
FIG. 2 is a diagram showing the relation between restraining torque and swing angle of a finger.

FIG. 2 is a diagram showing the relation between restraining (or, swing restriction) torque about the axis of swing 107 of the finger 101 produced by the reaction force of the spring 124, which is plotted on the vertical axis, and swing angle of the cam, and hence, the finger, which is plotted on the horizontal axis. As is obvious from the diagram, the cam face can be set to produce a maximum torque in the direction restricting the swing at the beginning of the swing of the finger, and then produce no torque after the finger swings by a predetermined angle. However in reality, the cam face slightly produces force in the direction restraining the swing because of the friction.

Figure 3:
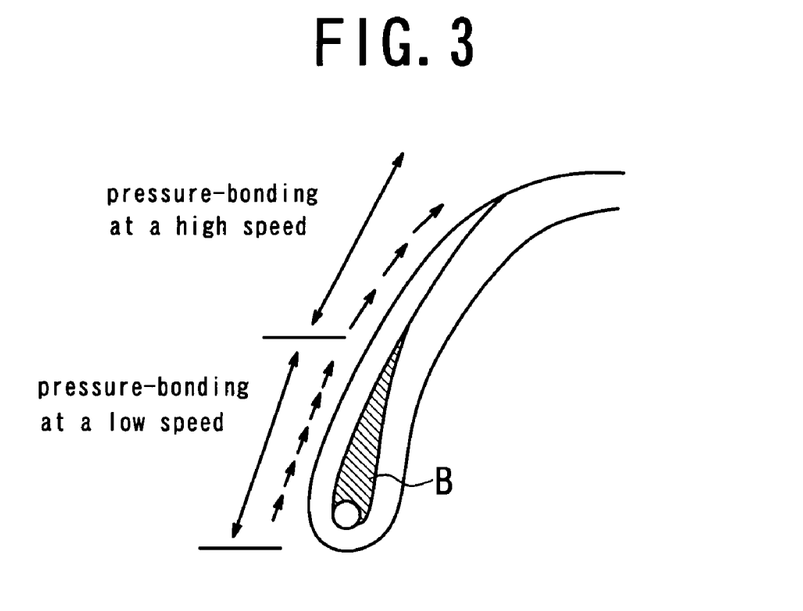
FIG. 3 is a diagram showing a position of a tire and a folding speed in folding operation.

FIG. 3 shows a moving speed of the finger over the outer surface of the tire in folding. As shown in the drawing, the finger 102 performs pressure-bonding at a low opening speed on the outer surface of the tire in the vicinity of the beads, and then performs pressure-bonding at a higher, constant speed after the finger swings by a predetermined angle.

As described hereinbefore, in the first embodiment of the present invention, by applying swing restriction (or restraining) torque on the finger 102 in the vicinity of the beads of the green tire and reducing the opening speed thereof, the tire components can be strongly pressure-bonded together, utilizing rubber's viscosity behavior, in which the rubber is bonded well when pressure-bonded with slow movement for a long time, and poorly bonded when pressure-bonded for a short time.

Figure 4:
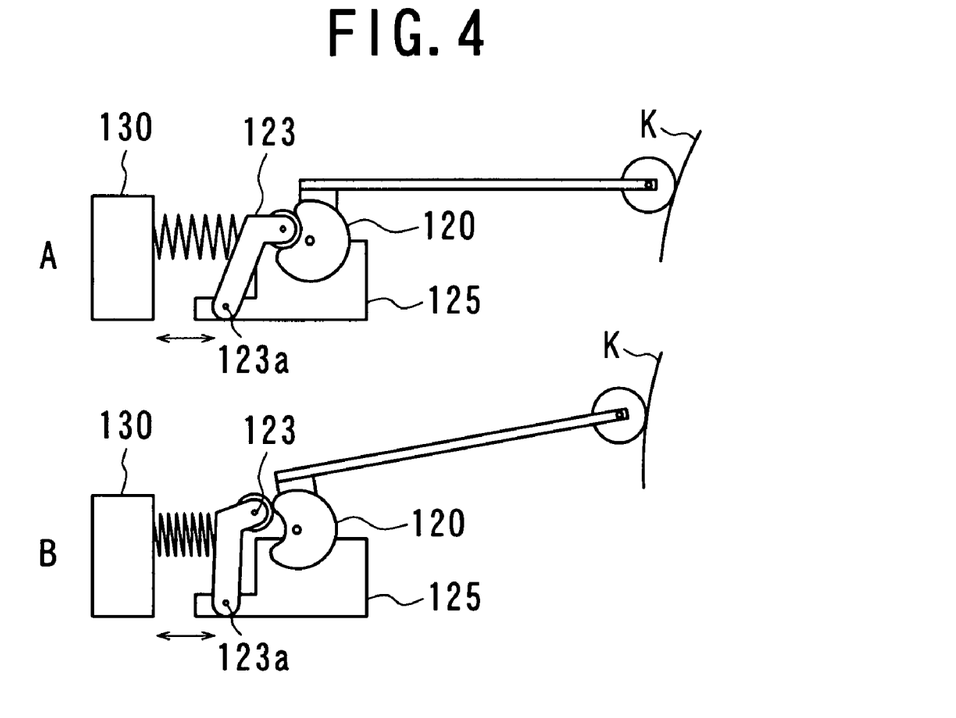
FIG. 4 is a diagram showing an embodiment in which a linkage is used instead of a sliding body in a first embodiment.

Now, another embodiment of the present invention will be described. FIG. 4 shows an embodiment in which a linkage 123 is used instead of the sliding body 120 in the first embodiment. More specifically, as shown, the generally inverted L-shaped linkage 123 is fitted with a roll 123b at its end, which functions as a cam follower and is allowed to swing about the axis of swing 123a. A spring 124 is interposed between the linkage 123 and the driver 130. The other configurations are the same as the first embodiment. FIG. 4A shows a state in which the finger is closed, and FIG. 4B shows a state in which the finger begins to open, compressing the spring. In the state of FIG. 4B, the finger slows down or temporally stops opening and strongly pressure-bond the tire component K.

Figure 5:
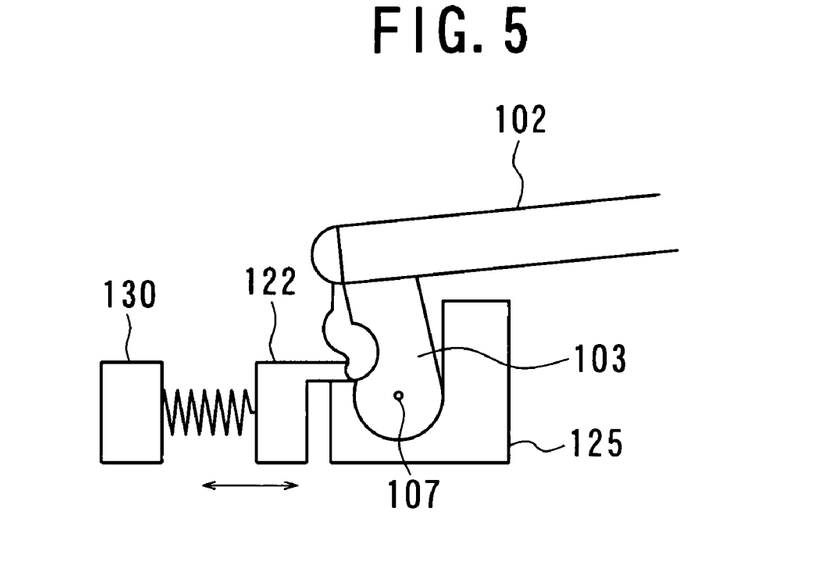
FIG. 5 is an enlarged view of a supporting finger in the vicinity of a cam in another embodiment.

FIG. 5 shows another embodiment. In this embodiment, a cam 120 is integrally-formed on a supporting finger 103 and is formed with a cam face in the shape of combined convex and concave. The rest of the configurations, as well as the action, are the same as the first embodiment.

Figure 6:
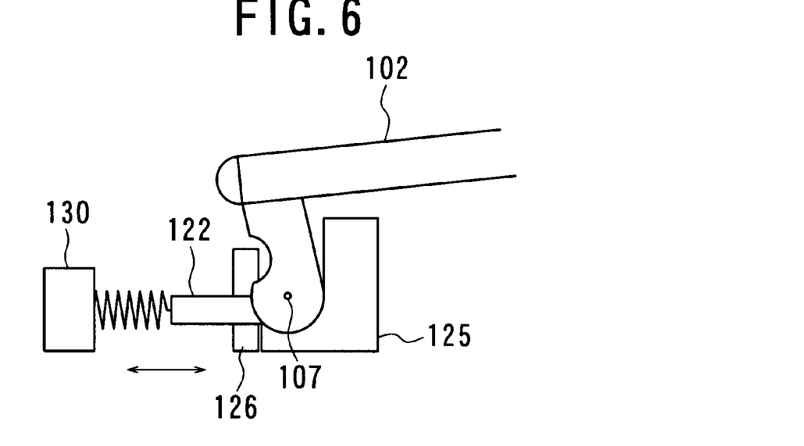
FIG. 6 is an enlarged view of a supporting finger in the vicinity of a cam in another embodiment.

FIG. 6 shows another embodiment. In this embodiment, a part of a supporting finger 103 is configured to be a cam face, and a cam follower 122 is slidably held in a retainer 126. This configuration not only saves the effort to separately prepare a cam and integrally fit it to the supporting finger 103 or the axis of swing 107, but also simplifies the structure and saves cost.

Figure 7:
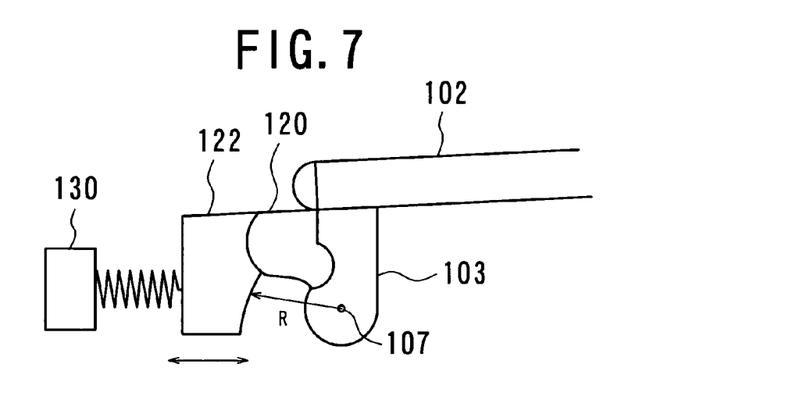
FIG. 7 is an enlarged view of a supporting finger in the vicinity of a cam in another embodiment.
Figure 8:
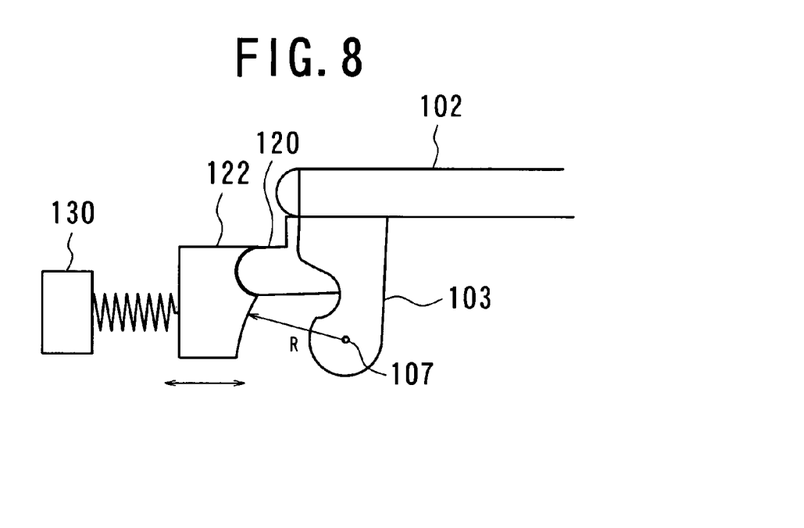
FIG. 8 is an enlarged view of a supporting finger in the vicinity of a cam in another embodiment.

FIG. 7 and FIG. 8 show another embodiment, respectively. In these embodiments, a cam face is formed on a cam follower 122, and a cam 120, fitted to a supporting finger 103, moves on the cam face in response to the swing of a finger 101. The cam 120 has a convex surface, and the cam follower 122 has a cam face including a concave surface corresponding to the convex surface of the cam, and a following arc-shaped surface with a predetermined radius R whose center is the axis of swing 107 of the finger 101. This shape of the cam face enables the finger 101 to open at a certain speed after it swings by a predetermined angle.

Although the spring has been described as a metallic spring in the above description, it is not limited to a metallic spring. As long as it can reduce the opening speed of the finger 101, by intervening between the driver 130 and the cam follower, it may be an air spring or any other elastic bodies. Also, the cam follower 122 has been described to be provided in the same number as the cam 120, though it may be integrally-formed with a ring-shaped body in a manner corresponding to each cam 120, for example.

As described hereinbefore, the tire molding apparatus with a folding mechanism according to the present invention use the cam and the spring as stretchable elastic means to improve the bonding in the vicinity of the beads. Also, in order to improve the bonding in the vicinity of the beads, the swing of the fingers is restricted by applying the torque so that the rolls are retained or stopped in a desired area for a relatively long time to improve a bonding effect in pressure-bonding the sides of the tire with the rolls.

Accordingly, the present invention has an advantage that the tire components can be strongly pressure-bonded in the vicinity of the beads, by freely controlling the duration of the pressure-bonding of the sides of the tire in folding a carcass ply of the tire, with utilizing rubber's viscosity behavior, in which the rubber is bonded well when pressure-bonded with slow movement for a long time, and poorly bonded when pressure-bonded for a short time. As shown in FIG. 2, the cam can be shaped to produce the swing restriction torque (in the direction opposing the force to open the finger) at the beginning of the swing, and then release the torque after the finger swings by a certain angle, so that the finger can continue the normal swinging operation for folding the tire component.

What is claimed is:

1. A tire molding apparatus with folding mechanisms comprising:
   a main shaft of a drum;
   folding fingers fitted with folding members on the ends, the fingers swinging between a closed position and an open position on axes of swing on said main shaft of the drum, for folding edges of a toroidally-transformed tire component disposed outside of the circumference of said main shaft of the drum with said folding members in response to the swing of the folding fingers from said closed position to said open position, and
   a means for changing opening speed and pressing force of said fingers capable of changing the pressing force applied to the tire component and folding speed of said fingers;
   wherein said means for changing opening speed and pressing force of the fingers comprises: first cams or cam followers integrally fitted to said fingers at their ends and rotated in response to the swing of the fingers; and second cam followers or cams pressing said first cams or cam followers, respectively, to open said fingers and slidable along said main shaft of the drum;
   wherein said cams have irregular cam faces that change the opening speed of said fingers from low, at the beginning of opening, to high in cooperation with said cam followers.

2. The tire molding apparatus with folding mechanisms according to claim 1, further comprising a driver that moves the folding fingers axially, and stretchable elastic members that connect the driver to said second cam followers or cams.

3. A method of folding a tire component to the periphery of bead cores and pressure-bonding the tire component to bead fillers or the tire component in molding a tire, said method comprising:
   providing a main shaft of a drum and a plurality of folding fingers fitted with folding members on the ends, the fingers swinging between a closed position and an open position on axes of swing on said main shaft of the drum, for folding edges of a toroidally-transformed tire component disposed outside of the circumference of said main shaft of the drum with said folding members in response to the swing of the folding fingers from said closed position to said open position,
   a first step of folding the tire component in the vicinity of the bead cores by moving the plurality of folding fingers at a low speed with a strong pressure-bonding force; and a second step of folding the tire component by moving the plurality of folding fingers at a higher speed with a weaker pressure-bonding force than the first folding step;

wherein an opening speed and pressing force of the fingers is changed by first cams or cam followers integrally fitted to said fingers at their ends and rotated in response to the swing of the fingers; and second cam followers or cams pressing said first cams or cam followers, respectively, to open said fingers and slidable along said main shaft of the drum; and wherein said cams have irregular cam faces that change the opening speed of said fingers from the low speed to the higher in cooperation with said cam followers.

4. The method according to claim 3, wherein stretchable elastic members connect a driver that moves the folding fingers axially to said second cam followers or cams.

* * * * *